(No Model.) 2 Sheets—Sheet 1.
J. E. LAYNG.
MACHINE FOR MAKING SPHERICAL GRAIN POWDER.
No. 566,777. Patented Sept. 1, 1896.
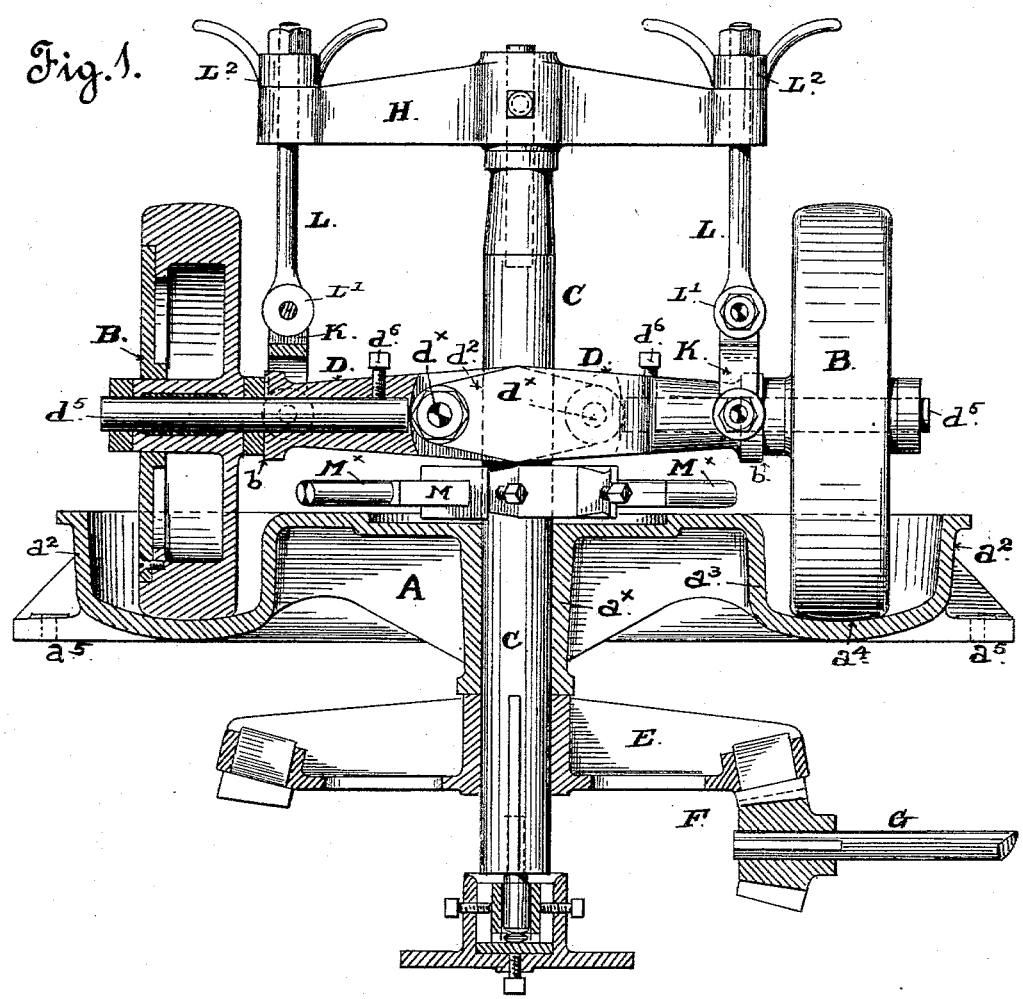
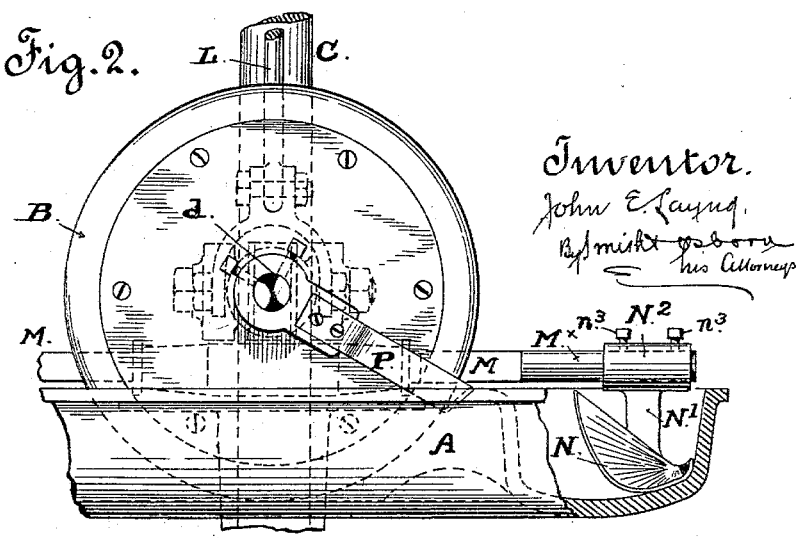
Witnesses.
Marcus S. Levé
M. Regner
Inventor.
John E. Layng,
By Smith Osborn
his Attorneys

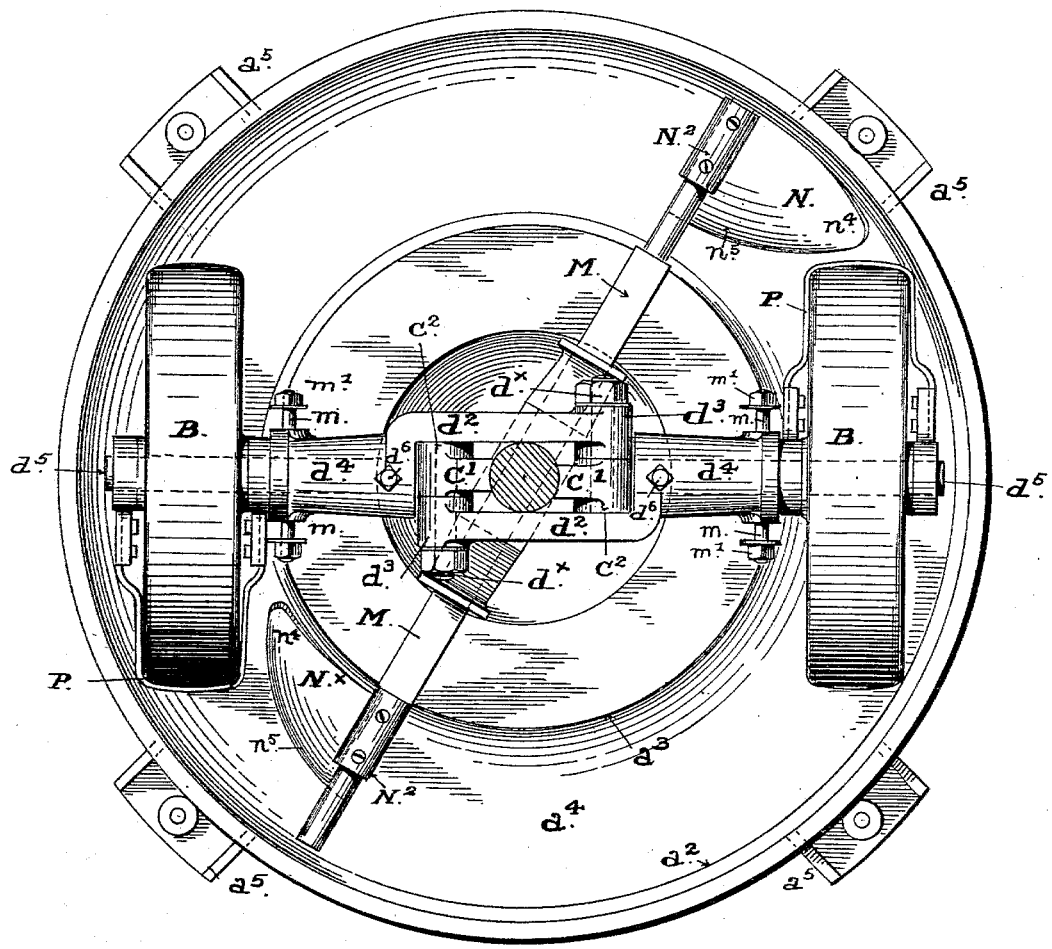

UNITED STATES PATENT OFFICE.

JOHN E. LAYNG, OF SAN FRANCISCO, CALIFORNIA.

MACHINE FOR MAKING SPHERICAL-GRAIN POWDER.

SPECIFICATION forming part of Letters Patent No. 566,777, dated September 1, 1896.

Application filed July 10, 1895. Serial No. 555,558. (No model.)

*To all whom it may concern:*

Be it known that I, JOHN E. LAYNG, a citizen of the United States, residing in the city and county of San Francisco, State of California, have invented certain new and useful Improvements in Machines for Making Spherical-Grain Powder, of which the following is a specification.

My invention relates to improvements made in machinery for manufacturing spherical-grain powders; and the invention has for its object, mainly, the production of a machine or apparatus in which the separator or several operations of grinding and mixing the substances of the explosive and of converting the mixture into grains of uniform size are performed and carried out in one pan or receptacle.

To such end and object my invention consists in certain novel parts and combination of parts as hereinafter described and pointed out, reference being had in the following description to the drawings that accompany and form part of this specification.

In the said drawings, Figure 1 represents in elevation and principally in vertical section a machine or apparatus for making spherical-grain powder constructed according to my invention. Fig. 2 is a side view in elevation, taken from the right-hand side of Fig. 1 and showing a portion of the pan with a part of the rim broken away. Fig. 3 is a top view of the machine with the upright shaft cut off below the cross-head.

The principal parts of this machine consist of the stationary pan A, two upright grinding-rollers B B, revolving in vertical planes on the ends of horizontally-set axles D D, carried by and driven from an upright shaft C, gears E F, connecting such shaft with a driving-shaft G, a cross-head H, fixed on the upright shaft over and substantially parallel with the roller-carrying arms, and to which such arms are connected by bails K and screw-threaded hangers L, and a horizontally-set cross-bar or arms M, extending across the pan, and plows or curved shoes N, supported by such arms in working position in the pan.

The pan A is an annular trough with substantially perpendicular standing sides $a^3$ $a^3$ and a bottom $a^4$, which is concave or deepest in the center and slopes upwardly to the standing sides. An opening in the center of the pan is provided for the upright shaft, and a long bearing $a^\times$ is cast with the center portion to support the shaft. Ears $a^5$ are provided on the body of the pan by which to secure it upon bed-timbers.

The shaft C, turning in the hollow bearing $a^\times$, has a step-bearing beneath the lower end and is connected with a power-shaft or driver G by a miter-gear and pinion E F. On that portion of the shaft which extends above the raised center of the pan are attached the inner ends of the axles by a hinge or pivot-joint $d^\times$, and the outer end of the axle is capable of moving vertically in an arc on this pivot or center as the axle is raised or lowered at the outer end. Such point $d^\times$ is situated on the side of the upright shaft opposite to the roller-carrying end of the axle, so that a long axle and a practically vertical lift of the roller are obtained.

The manner of constructing and attaching each axle to the upright shaft will be understood from Figs. 1 and 3 of the drawings. The inner end portion $d^2$ is a flat bar with a boss or knuckle portion $d^3$ on the end for a pivot-bolt $d^\times$ and a sleeve or tubular portion $d^4$, extending outwardly from the opposite end of the bar $d^2$, the last-named part being offset, so that the center line of the bore or aperture through the sleeve lies in a plane with the center of the upright shaft, while the flat portion $d^2$ extends across at one side and clears the shaft. These portions $d^2$ of the two axles overlap each other on opposite sides of the shaft and are attached to the ends of two rigid outstanding arms or projections C' C' on the shaft having bosses or knuckle portions $C^2$, with apertures for the bolts $d^\times$. The spindle portion of the axle carries the roller and is formed of a cylindrical rod $d^5$, fixed in the axle by the screw $d^6$. The rod is reversible end for end in the sleeve and is made of suitable length to allow the portion within the sleeve to be utilized for the spindle when the other portion in use has become worn.

The rollers B are fitted to turn on the spindles and are confined by the collars $b$.

Across the top end of the upright shaft over and in line with the two axles is fixed a cross-head H, turning with the shaft, and from each end of such cross-head a rod or hanger L, screw-threaded on the upper end and having on the lower end an eye L', to which is attached a bail K, hanging perpendicularly in line with the axle. The threaded end passes through a perpendicular aperture in the end of the cross-head and is furnished with nuts $L^2$, by which the rod can be lengthened or shortened, and the bail is attached to the sleeve of the axle just back of the shoulder $b$ by the screw-threaded studs $m$ and the nuts $m'$. By such means the outer ends of the axles are raised or lowered to adjust the contact of the roller with the bottom of the pan in the grinding operation, and also for the purpose of raising and holding up the rollers out of working contact with the bottom of the pan when the grinding is finished and the material is in condition for the graining operation. In this last-mentioned operation the rollers are held up clear of the pan, and the material is operated on by the plows or curved blades alone.

The cross-arm M, that carries these blades, is set diametrically across the pan, and passing through a slot in the upright shaft is fixed rigidly therein. The blades N $N^\times$, secured on the outer ends of the cross-arm, are supported by it in the trough of the pan just in front of the grinding-rollers, and are adjustable also on the cylindrical ends $M^\times$ or outer spindle portions of the arm.

Each blade is secured to a short standard N', having on the upper end a long sleeve or hub $N^2$, fitting the spindle $M^\times$ of the arm M and fixed by screws $n^3$, such means affording the necessary adjustment of the blade. The shape of these blades will be understood from Fig. 2, where one of them is seen in elevation, and from Fig. 3, where it is shown in top view; but while one blade is the same in shape as the other they are reversed in position, and are set the one, N, against or in close relation to the outer rim of the trough and the other, $N^\times$, in corresponding position with respect to the inner rim. Thus the higher side $n^5$ of the curved surface of the blade N sets next to the inner rim and the lowest edge $n^4$ lies close to the bottom of the pan and next to the outer standing side of the pan; but in the other blade, $N^\times$, these conditions are reversed, and the lowest edge is placed nearest the inner standing side, while the highest part $n^5$ of the curved surface sets toward the outer standing side. The result of this is that one blade acts to raise and throw the material in the trough from the outer side or rim inward, and the other blade from the inner rim outward, the two blades thereby acting conjointly to throw the material from the standing sides toward the center and in the path of the rollers.

Such is the office or function of the blades N $N^\times$ during the grinding operation; but when the rollers are raised and held clear of the material the same blades, by virtue of their curved shape and angular position, act upon the ground material in such manner as they travel around in the trough that they divide the mixture into grains or particles of uniform size and bring them to a spherical shape. In this operation of graining the mixture the size of the pellets or particles produced is governed by the degree of dryness in the mixture, as is well understood by the manufacturer, while the pellets, of whatever size produced, are brought to a true spherical shape by being taken up on the curved inclined surface of the blade at the leading edge $n^4$, which moves in close relation to the bottom of the pan for that purpose, and being caused to pass over such curved inclined surface and off the highest edge or side of the blade. In this movement a rolling motion is given to the pellets, and by the frequent repetition of such lifting and dropping movements they are brought to a spherical shape and of uniform size.

Where the bottom of the grinding-pan is made of concave shape in cross-section the tread or rim of the roller is made convex and of corresponding curvature; but with a flat-bottom pan the roller will have a flat tread. A scraper P is secured to the axle behind each roller to keep the surface of the tire clean.

Having thus fully described my invention, what I claim as new, and desire to secure by Letters Patent, is—

The herein-described machine for making spherical-grain powder comprising a stationary annular trough; a vertical shaft extending through the center of said trough; a driving-shaft geared into said vertical shaft to give rotation thereto; a cross-head fixed on the upper end of the shaft and projecting diametrically over the trough; the axles secured to the shaft below the cross-head by hinge connections on which they are movable in vertical arcs to raise and lower their outer ends, each axle having an offset inner member crossing the vertical shaft and attached to said shaft on the side opposite the outer end of the axle, and a spindle on the outer end; the screw-threaded rods, the bails connecting the lower ends of said rods to the outer ends of the axles and the adjusting-nuts on the upper end, said rods passing through bearings in the ends of the cross-head; rollers on the spindles of said axles; and the radial arms fixed on the upright shaft beneath the roller-carrying axles and having curved blades, the surfaces of which are formed on curves and are set with relation to the bottom surface of the annular trough as described to give a spherical shape to the grains of powder.

In testimony that I claim the foregoing I have hereunto set my hand and seal.

JOHN E. LAYNG. [L. S.]

Witnesses:
C. W. M. SMITH,
CHAS. E. KELLY.